(12) United States Patent
Horley et al.

(10) Patent No.: US 9,229,908 B2
(45) Date of Patent: *Jan. 5, 2016

(54) IDENTIFIER SELECTION

(71) Applicant: ARM Limited, Cambridge (GB)

(72) Inventors: John Michael Horley, Cambridge (GB); Andrew Brookfield Swaine, Cambridge (GB); Michael John Williams, Cambridgeshire (GB)

(73) Assignee: ARM Limited, Cambridge (GB)

( * ) Notice: Subject to any disclaimer, the term of this patent is extended or adjusted under 35 U.S.C. 154(b) by 244 days.

This patent is subject to a terminal disclaimer.

(21) Appl. No.: 13/934,741

(22) Filed: Jul. 3, 2013

(65) Prior Publication Data

US 2014/0019501 A1 Jan. 16, 2014

Related U.S. Application Data

(63) Continuation-in-part of application No. 12/659,669, filed on Mar. 16, 2010, now Pat. No. 8,510,356.

(51) Int. Cl.
*G06F 17/10* (2006.01)
*G06F 7/02* (2006.01)
*G06F 7/76* (2006.01)

(52) U.S. Cl.
CPC ........ *G06F 17/10* (2013.01); *G06F 7/02* (2013.01); *G06F 7/76* (2013.01); *G06F 7/764* (2013.01)

(58) Field of Classification Search
None
See application file for complete search history.

(56) References Cited

U.S. PATENT DOCUMENTS

| | | | |
|---|---|---|---|
| 4,748,575 A | 5/1988 | Ashkin et al. |
| 6,173,300 B1 | 1/2001 | Mahurin |
| 6,381,622 B1 | 4/2002 | Lie |

*Primary Examiner* — Michael D Yaary
(74) *Attorney, Agent, or Firm* — Nixon & Vanderhye P.C.

(57) ABSTRACT

A data processing apparatus is provided which is configured to select $2^M$ selected identifiers within a possible range of up to $2^N$ identifiers, where M≤N. The data processing apparatus comprises a selection storage unit configured to store at least N+1 identifier selection bits, wherein a position of a first marker bit in the at least N+1 identifier selection bits determines M, and an identifier selection unit configured to determine the $2^M$ selected identifiers. The $2^M$ selected identifiers fall within a range defined by a base identifier and a ceiling identifier. N-M bits of the N+1 identifier selection bits form N-M bits of the base identifier, and M zeroes form a further M bits of the base identifier. The ceiling identifier corresponds to the base identifier, except that the M zeroes of the base identifier are replaced by M ones.

31 Claims, 12 Drawing Sheets

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| b  | b  | b  | b  | b  | b  | b  | b | b | b | b | b | b | b | b | b | 1 |

↳ Single event bbbb_bbbb_bbbb_bbbb is selected

FIG. 3A

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| b  | b  | b  | b  | b  | b  | b  | b | b | b | b | 1 | ∅ | ∅ | ∅ | ∅ | ∅ |

↳ 32 events from bbbb_bbbb_bbb∅_∅∅∅∅
to bbbb_bbbb_bbb1_1111 selected

FIG. 3B

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1  | ∅  | ∅  | ∅  | ∅  | ∅  | ∅  | ∅ | ∅ | ∅ | ∅ | ∅ | ∅ | ∅ | ∅ | ∅ | ∅ |

↳ All events selected

FIG. 3C

| 16 | 15 | 14 | 13 | 12 | 11 | 10 | 9 | 8 | 7 | 6 | 5 | 4 | 3 | 2 | 1 | Ø |
|----|----|----|----|----|----|----|----|----|----|----|----|----|----|----|----|----|
| 1  | b  | b  | b  | b  | b  | b  | b  | b  | b  | b  | b  | b  | b  | b  | b  | b  |

↳ Single event bbbb_bbbb_bbbb_bbbb is selected

FIG. 4A

| 16 | 15 | 14 | 13 | 12 | 11 | 10 | 9 | 8 | 7 | 6 | 5 | 4 | 3 | 2 | 1 | Ø |
|----|----|----|----|----|----|----|----|----|----|----|----|----|----|----|----|----|
| Ø  | Ø  | Ø  | Ø  | Ø  | 1  | b  | b  | b  | b  | b  | b  | b  | b  | b  | b  | b  |

↳ 32 events from ØØØØ_Øbbb_bbbb_bbbb
to 1111_1bbb_bbbb_bbbb selected

FIG. 4B

| 16 | 15 | 14 | 13 | 12 | 11 | 10 | 9 | 8 | 7 | 6 | 5 | 4 | 3 | 2 | 1 | Ø |
|----|----|----|----|----|----|----|----|----|----|----|----|----|----|----|----|----|
| Ø  | Ø  | Ø  | Ø  | Ø  | Ø  | Ø  | Ø  | Ø  | Ø  | Ø  | Ø  | Ø  | Ø  | Ø  | Ø  | 1  |

↳ All events selected

FIG. 4C

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 1 | b | b | b | b | b | b | b | b | b | b | b | b | b | b | b | b | 1 |

↳ Single event bbbb_bbbb_bbbb_bbbb is selected

FIG. 5A

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| Ø | 1 | b | b | b | b | b | b | b | b | b | b | 1 | Ø | Ø | Ø | Ø | Ø |

↳ 64 events from Øbbb_bbbb_bbbØ_ØØØØ
to 1bbb_bbbb_bbb1_1111 selected

FIG. 5B

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| 1 | 1 | Ø | Ø | Ø | Ø | Ø | Ø | Ø | Ø | Ø | Ø | Ø | Ø | Ø | Ø | Ø | Ø |

↳ All events selected

FIG. 5C

IDENTIFIER SELECTION

This application is a Continuation-In-Part of U.S. application Ser. No. 12/659,669, filed 16 Mar. 2010, the entire contents of each of which are hereby incorporated by reference.

BACKGROUND OF THE INVENTION

1. Field of the Invention

The present invention is concerned with the selection of a subset of identifiers from within a range of identifiers. In particular the present invention is concerned with the selection of $2^M$ identifiers within a range of up to $2^N$ identifiers, where M is less than or equal to N.

2. Description of the Prior Art

There may be various situations in which it is required to select a subset of identifiers from a range of identifiers, for example in a tracing unit which monitors the activity of a processor core, the processor core may be configured to issue data indicative of its activities to the tracing unit over a number of different channels. In such a situation, it may be desired to filter those channels, so that only a subset of all possible channels are actively monitored and have their associated information converted into a trace stream for output. Another such situation is the use of a large number of addresses, where it is desired to monitor only a subset of those addresses, for example in a watchpoint unit embedded within a processor core. Typically such identifiers are defined by a sequence of bits, such that up to $2^N$ identifiers may be defined by N bits.

In order to select a subset of identifiers (e.g. the above mentioned channel or addresses) various techniques are known. For example, it is known to configure a register to define an identifier of interest, such that when use of that identifier occurs a match with the identifier as defined in the register may trigger a suitable response. More generally, it is known to provide a number of such registers corresponding to a number of identifiers of interest, such that when any of those identifiers are used the corresponding response may be triggered. However, this approach has the disadvantage that if a large number of identifiers form the subset of interest it will be necessary to provide a corresponding large number of registers defining those selected identifiers. In other words, this approach can be expensive to implement in hardware.

It is also known to select a range of identifiers by defining a starting identifier and an end identifier, using a register for each, wherein any identifier falling within the range spanned by the start identifier and end identifier is selected. However, this approach not only requires two registers of equal size to the identifier space to identify the upper and lower limit, but also further and more complex comparison units configured to determine if a given identifier falls within the range. In other words, this approach can be expensive to implement in hardware.

It is also known to select a range of identifiers by defining a base identifier and a window size, for example a N-bit base identifier and a $\log_2(N)$ bit window size. However, this approach requires a configuration register for each, and further logic to determine if a given identifier falls within the defined window. In other words, this approach can be expensive to implement in hardware.

In some situations where such a subset of identifiers is required to be monitored, for example in system-on-chip (SoC) arrangement, space may be at a premium, and consequently it is desirable to be able to define and identify the subset of identifiers as efficiently as possible.

Hence it would be desirable to provide an improved manner of efficiently selecting a subset of identifiers from within a possible range of up to $2^N$ identifiers.

SUMMARY OF THE INVENTION

Viewed from a first aspect, the present invention provides a data processing apparatus configured to select $2^M$ selected identifiers within a possible range of up to $2^N$ identifiers, where M≤N, said data processing apparatus comprising: a selection storage unit configured to store at least N+1 identifier selection bits, wherein a position of at least a first marker bit in said at least N+1 identifier selection bits determines M; and an identifier selection unit configured to determine said $2^M$ selected identifiers, wherein said $2^M$ selected identifiers fall within a range defined by an associated base identifier and a ceiling identifier, wherein N-M bits of said at least N+1 identifier selection bits form N-M bits of said associated base identifier, and M zeroes form a further M bits of said associated base identifier, wherein said ceiling identifier corresponds to said associated base identifier with said M zeros that form M bits of said associated base identifier replaced with ones.

For a configuration in which there are up to $2^N$ possible identifiers, a selection storage unit is provided which stores at least N+1 identifier selection bits. For example, where the range of possible identifiers comprises $2^8$ identifiers, the selection storage unit is configured to store at least 9 identifier selection bits. Within the at least N+1 identifier selection bits, the position of a first marker bit determines M, and this defines there to be $2^M$ selected identifiers. The selected identifiers fall within a range defined by an associated base identifier and a ceiling identifier. The associated base identifier is defined by N-M bits of the at least N+1 identifier selection bits providing N-M bits of the associated base identifier, in addition to M zeroes. For example, when N=8 and the position of the first marker bit indicates that M=5, three bits of the at least 9 identifier selection bits and five zeros form the associated base identifier. The ceiling identifier corresponds to the associated base identifier, with the 5 zeros replaced by ones. For example, if the three bits of the at least 9 identifier selection bits are 101 and if the associated base identifier is 10100000 then the ceiling identifier would be 10111111. In this example the b $2^5$ selected identifiers are defined by a range between the associated base identifier and the ceiling identifier, i.e. between 10100000 and 10111111.

The inventors of the present invention realised that by the provision of the at least N+1 identifier selection bits, a very efficient encoding of $2^M$ selected identifiers within the possible range of up to $2^N$ identifiers (where M is less then or equal to N) could be provided. Furthermore the possible subsets of selected identifiers can be flexibly defined. On the one hand only a single identifier may be selected, when the first marker bit position in the at least N+1 identifier selection bits indicates that M=0, such that N bits of the at least N+1 identifier selection bits form N bits of the associated base identifier and no zeros are added (i.e. the identifier selection bits provide all bits of the associated base identifier). Conversely all possible identifiers may be selected by positioning the first marker bit in said at least N+1 identifier selection bits to indicate M=N, such that no bits of the N+1 identifier selection bits form bits of the associated base identifier, and the associated base identifier consists of all zeros. All possible identifiers are then selected since the ceiling identifier consists of all ones and the $2^M$ (i.e. $2^N$) selected identifiers fall within the range defined by the associated base identifier and the ceiling identifier. It will be recognised that implementations in which there are exactly $2^N$ identifiers (in other words an exact power of 2) from which the $2^M$ selected identifiers can be selected may be viewed as the simplest to construct. Nevertheless embodiments of the present invention may have fewer than $2^N$ identifiers from which the $2^M$ selected identifiers can be selected.

It will be recognised that the relationship between the $2^M$ selected identifiers, the associated base identifier, and the ceiling identifier may take many forms. In some embodiments, said $2^M$ selected identifiers comprise $2^M-1$ selected identifiers following said associated base identifier at increments of $2^{N-M}$, and N-M bits of said at least N+1 identifier selection bits form N-M least significant bits of said associated base identifier, and M leading zeros form M most significant bits of said associated base identifier. Using N-M bits of said at least N+1 identifier selection bits to form N-M least significant bits of said associated base identifier allows for a conveniently direct translation, wherein this set of least significant bits of the identifier selection bits translate directly into the same set of least significant bits of the associated base identifier.

In other embodiments, the data processing apparatus is configured to select a plurality of groups of selected identifiers, each of said groups of selected identifiers comprising $2^M$ selected identifiers, wherein each of said groups of selected identifiers has a different associated base identifier, and wherein for each of said groups of selected identifiers, $2^M-1$ selected identifiers incrementally follow said associated base identifier. According to these embodiments, it is possible to select groups of identifiers, with each of the identifiers within a single group incrementally following from the base identifier associated with that group. The groups themselves may be separated. That is, in some instances, not all of the selected identifiers incrementally follow from a single associated base identifier. It is therefore possible to select identifiers where the middle bits have specific values. In some of these embodiments, the selection storage unit is configured to store at least N+2 identifier selection bits, wherein a position of at least a second marker bit in said at least N+2 identifier selection bits determines a parameter L, wherein said data processing apparatus is configured to select $2^{N-L}$ groups of selected identifiers, where M≤L, wherein the plurality of associated base identifiers in said groups of selected identifiers are at increments of $2^{N-L}$.

Alternatively, in some embodiments using a single marker bit and at least N+1 identifier selection bits, said $2^M$ selected identifiers comprise $2^M-1$ selected identifiers incrementally following said associated base identifier, wherein said N-M bits of said at least N+1 identifier selection bits form N-M most significant bits of said associated base identifier, and M trailing zeros form M least significant bits of said associated base identifier.

In some embodiments, the data processing apparatus comprises a comparison unit configured to determine whether or not a candidate identifier is one of said $2^M$ selected identifiers. In some of these embodiments, the data processing apparatus also comprises a transformation unit configured to perform a transformation operation on a candidate identifier to produce a modified candidate identifier, wherein said comparison unit is configured to determine whether or not said modified candidate identifier is one of said $2^M$ selected identifiers. By using a transformation unit, it is possible to alter a candidate identifier in such a way that the selection process is carried out in a more efficient manner. Rather than selecting identifiers based on multiple non-consecutive bits, e.g. based on $2^{nd}$, $5^{th}$, $6^{th}$, $8^{th}$, and $12^{th}$ bits of the identifiers, which would require more than two marker bits, the bits of the candidate identifier can be rearranged. Accordingly, the bits that determine whether or not an identifier is selected are made to be consecutive. The selection can then be performed using a single marker bit.

A similar transformation unit can be used to perform a transformation operation on at least N+1 bits to produce said at least N+1 identifier selection bits, or on at least N+2 bits to produce said at least N+2 identifier selection bits. That is, the data processing apparatus can then select the selected identifiers using the modified identifier selection bits.

It will be recognised that the usage of bits within the at least N+1 identifier selection bits could be arranged in many different arbitrary ways, but according to one embodiment said N-M bits of said at least N+1 identifier selection bits comprise N-M least significant bits of said at least N+1 identifier selection bits. Using the N-M least significant bits of the at least N+1 identifier selection bits provides a conveniently direct translation, wherein this set of least significant bits of the identifier selection bits translate directly into the same set of least significant bits of the associated base identifier.

It will also be recognised that the usage of bit positions within the at least N+1 identifier selection bits to indicate M could be arranged in many different arbitrary ways, but in some embodiments said first marker bit is stored at bit N-M of said at least N+1 identifier selection bits.

In some embodiments having a second marker bit and at least N+2 identifier selection bits, said second marker bit is stored at bit L+1 of said at least N+2 identifier selection bits. As previously mentioned, L is defined by a position of the second marker bit.

It will be understood that the usual terminology of "bit X" of a given value is used here, where bits are numbered starting from the least-significant bit 0 up to the most-significant bit Y for a Y+1 bit value, e.g. in an 8 bit value, the bits are numbered sequentially from 0 to 7.

It will be recognised that the selection of $2^M$ selected identifiers within a possible range of up to $2^N$ identifiers could take place in many different contexts, but in one embodiment said data processing apparatus comprises a tracing unit configured to provide trace information indicative of activity of a processor core. Within a tracing unit providing trace information indicative of the activity of a processor core it is typical that space is at a premium, and an efficient coding such as that provided by the present invention is particularly advantageous. Furthermore, such a tracing unit may be configured to in principle monitor a large number of possible identifiers, whilst in practice it is advantageous (for example to avoid overloading the limited bandwidth of the trace stream generated) to identify a subset of identifiers.

In such a tracing unit, in one embodiment said up to $2^N$ identifiers comprise channels via which said processor core can pass said trace information to said tracing unit. The use of up to $2^N$ channels over which the processor core can pass trace information to the tracing unit provides an advantageous mechanism by which trace information can be associated with many different sources, for example different processes executing on the processor core.

In other embodiments said up to $2^N$ identifiers are a range of address locations. In such embodiments said data processing apparatus may comprise an address monitoring unit configured to monitor use of said range of addresses. In a data processing apparatus it may be required to monitor a subset of addresses from within a large range of possible addresses, and the techniques of the present invention provides a particularly efficient manner of selecting such a subset. An address monitoring unit could take a number of forms, but in one embodiment said address monitoring unit is a watchpoint unit in a processor core. Within the processor core an efficient definition of a subset of addresses of interest is particularly beneficial, to avoid using up valuable space within the core. It will be appreciated that the range of address locations could be variously configured. In one embodiment said range of address locations is addresses of bytes of memory. In another embodiment said range of address locations is addresses of words of memory.

In other embodiments said data processing apparatus comprises a bus transaction monitoring unit configured to monitor use of a range of bus transaction identifiers, and wherein said up to $2^N$ identifiers comprise said range of bus transaction identifiers. There may be a large number of identifiers used to identify particular transactions, and the present invention provides an efficient mechanism for defining a subset of those bus transaction identifiers which may be desired to be monitored.

It will be appreciated that the selection storage unit could take a number of forms, but according to one embodiment said selection storage unit comprises an at least N+1 bit register. This provides an easily implemented mechanism for defining and storing the identifier selection bits.

It will be recognised that the particular choice of meaning of bits within the identifier selection bits is arbitrary, and in some embodiments said first marker bit comprises a logical one, whereas in other embodiments said first marker bit comprises a logical zero. The same may be said for any other marker bits in the identifier selection bits.

In one embodiment, said data processing apparatus is configured to identify said first marker bit at a most significant bit position of said at least N+1 identifier selection bits in which a predetermined value is stored. Hence to identify the position of the first marker bit the data processing apparatus need simply examine each bit of the at least N+1 identifier selection bits in order of bit significance until that predetermined value is first encountered.

In another embodiment, said data processing apparatus is configured to identify said first marker bit at a least significant bit position of said at least N+2 identifier selection bits in which a predetermined value is stored, and said data processing apparatus is configured to identify said second marker bit at a most significant bit position of said at least N+2 identifier selection bits in which a predetermined value is stored. Hence, to identify the position of the first marker bit, the data processing apparatus need simply firstly examine each bit of the at least N+2 identifier selection bits in order of increasing bit significance from the least significant bit until that predetermined value is first encountered and then secondly examine each bit of the at least N+2 identifier selection bits in order of decreasing bit significance from the most significant bit until the predetermined value is first encountered.

It will be recognised that the data processing unit could be configured in a number of ways, but in one embodiment said data processing unit comprises a mask generator and a masked comparator unit configured to take, as inputs, outputs of said mask generator, a candidate register, and said selection storage unit. In some such embodiments, said mask generator is configured to generate a N-bit mask value from said at least N+1 identifier selection bits and said masked comparator unit is configured to compare the outputs of the candidate register and the selection storage unit as qualified by the output of said mask generator. For example, an output of the mask generator may indicate that certain bits in the candidate register and the selection storage unit do not need to be compared. That is, the comparison will not be affected by the values of those particular bits and whether or not they are the same in the candidate register and the selection storage unit.

In some embodiments using at least N+2 identifier selection bits and a second marker bit, said data processing apparatus comprises a mask generator and a masked comparator unit configured to take, as inputs, outputs of said mask generator, a candidate register, and said selection storage unit; and said mask generator is configured to generate a N-bit mask value from said at least N+2 identifier selection bits and said masked comparator unit is configured to compare the outputs of the candidate register and the selection storage unit as qualified by the output of said mask generator.

Viewed from a second aspect the present invention provides a data processing apparatus configured to select $2^M$ selected identifiers within a possible range of up to $2^N$ identifiers, where M≤N, said data processing apparatus comprising: selection storage means for storing at least N+1 identifier selection bits, wherein a position of at least a first a marker bit in said at least N+1 identifier selection bits determines M; and identifier selection means for determining said $2^M$ selected identifiers, wherein said $2^M$ selected identifiers fall within a range defined by an associated base identifier and a ceiling identifier, wherein N-M bits of said at least N+1 identifier selection bits form N-M bits of said associated base identifier, and M zeroes form a further M bits of said associated base identifier, wherein said ceiling identifier corresponds to said associated base identifier with said M zeros that form M bits of said associated base identifier replaced with ones.

Viewed from a third aspect the present invention provides a method of selecting $2^M$ selected identifiers within a possible range of up to $2^N$ identifiers, where M≤N, said method comprising the steps of: providing at least N+1 identifier selection bits; setting at least a first marker bit at a position in said at least N+1 identifier selection bits to determine M; and reading said at least N+1 identifier selection bits, wherein said $2^M$ selected identifiers fall within a range defined by an associated base identifier and a ceiling identifier, wherein N-M bits of said at least N+1 identifier selection bits form N-M bits of said associated base identifier, and M zeroes form a further M bits of said associated base identifier, wherein said ceiling identifier corresponds to said associated base identifier with said M zeros that form M bits of said associated base identifier replaced with ones, wherein said method steps are implemented on a data processor.

BRIEF DESCRIPTION OF THE DRAWINGS

The present invention will be described further, by way of example only, with reference to embodiments thereof as illustrated in the accompanying drawings, in which:

FIGS. 3A-3C illustrate different event selections in one embodiment;

FIGS. 4A-4C illustrate different event selections in another embodiment;

FIGS. 5A-5C illustrate different event selections in another embodiment;

DESCRIPTION OF THE PREFERRED EMBODIMENTS

Figure 1:
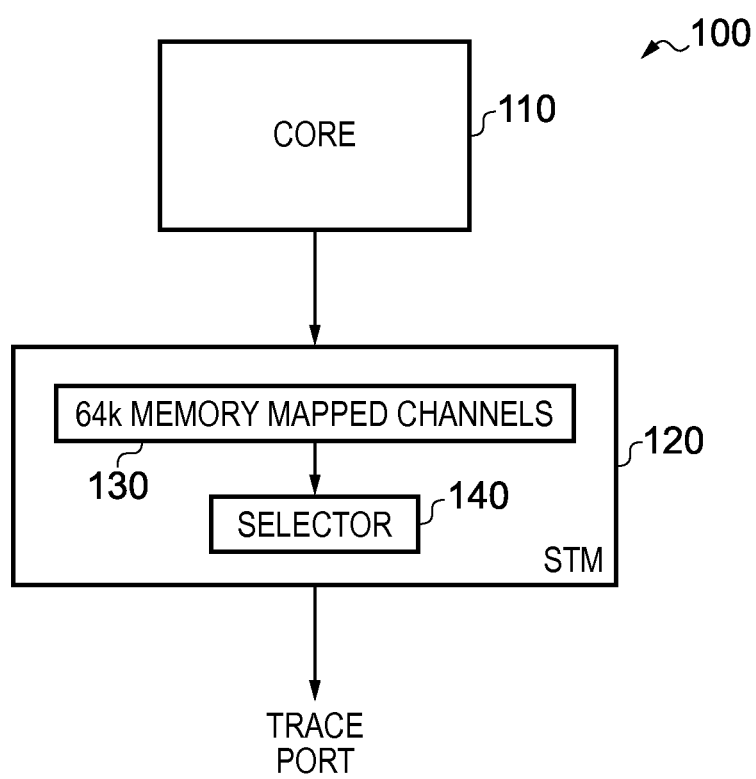
FIG. 1 schematically illustrates a tracing unit generating a trace stream in dependence on the activity of a processor core.

FIG. 1 schematically illustrates a data processing system 100 in which a processor core 110 passes information indicative of its processing activities to a tracing unit 120. The tracing unit "STM" 120 can receive the information from processor core 110 over 65,536 ($2^{16}$) memory mapped channels 130. The processor core 110 is configured to issue information to STM 120 via a particular channel, to indicate the source of that information. For example a particular channel (or channels) may be allocated to a particular process executing on processor core 110, such that information received over that channel (or channels) is known to be associated with that particular process. STM 120 further comprises a selector 140 which is configured to identify a subset of the memory mapped channels, such that not all channels are continuously monitored, but at any given time only that defined subset are monitored and the information received via those channels in that subset is used to generate the trace stream passed to the trace port.

Figure 2A:
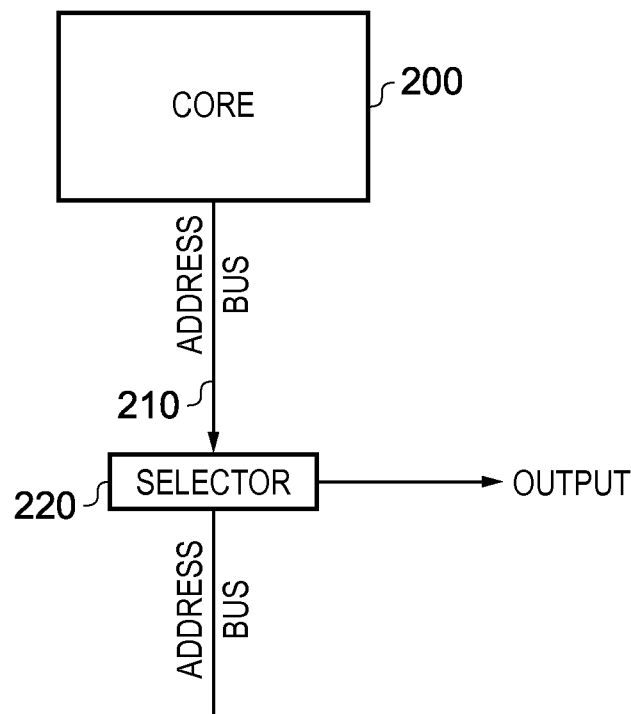
FIG. 2A schematically illustrates a selector monitoring particular addresses used on an address bus by a processor core.

FIG. 2A schematically illustrates a processor core 200 which is connected to an address bus 210. The processor core 200 makes use of the address bus 210, for example to specify memory locations it wishes to access. Selector 220 is configured to watch address bus 210 and to output information when any one of a particular subset of the addresses used on address bus 210 are used. A possible range of up to $2^N$ addresses can be used on address bus 210, and the selector 220 is configured to monitor a subset of $2^M$ addresses, where M is less than or equal to N. In the illustrated embodiment the addresses could for example be addresses of bytes of memory or alternatively could be addresses of words of memory.

Figure 2B:
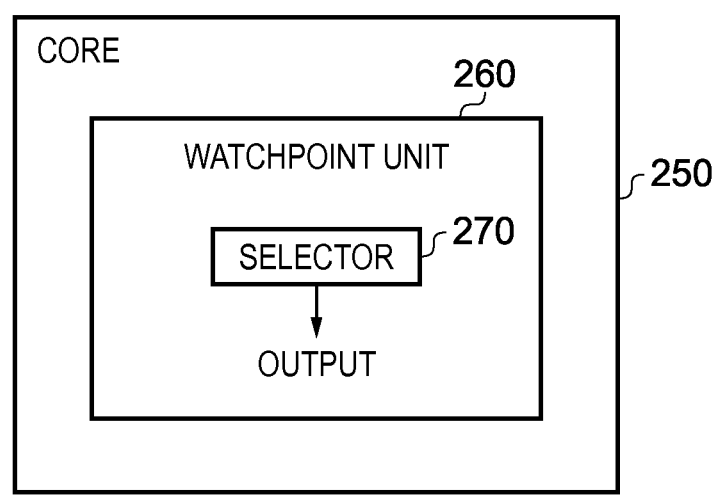
FIG. 2B schematically illustrates a watchpoint unit within a processor core.

FIG. 2B schematically illustrates a processor core 250 comprising a watchpoint unit 260, which is configured to monitor addresses used by the processor core 250. Within watchpoint unit 260, selector 270 is configured to monitor a subset of $2^M$ addresses within a possible range of up to $2^N$ addresses, where M is less than or equal to N, and to output information when that subset is used.

FIGS. 3A, 3B and 3C illustrate how different sets of events may be selected in an embodiment such as that illustrated in FIG. 1 from the 65,536 memory mapped channels available. The selector 140 is configured to monitor only a subset, and this is performed as is schematically illustrated in FIG. 3A-3C. The 65,536 channels correspond to 65,536 events that may be "selected events", wherein a particular event is specified by an identifier having 16 bits. Within selector 140 there is a selection storage unit which comprises a 17-bit register. In particular, the position of a marker bit within this 17-bit register determines the event or events that will be selected by selector 140. The bit in which the marker bit is stored is defined as the lowest bit position at which a logical one is stored. Note that the choice of use of one and zero in any given embodiment is clearly arbitrary and thus the particular bit implementation described with reference to FIGS. 3A-3C could trivially be inverted.

FIG. 3A thus illustrates a situation which the marker bit is stored in bit zero of the register, this being the lowest bit of position at which a one is stored. Note that the notation "b" indicates that either a one or a zero could be stored at this position (the particular choice defining the single event to be selected). In the arrangement illustrated in FIG. 3A since the marker bit is stored at bit zero of the register, bits 16 down to 1 of the register determine the single event that will be selected.

According to the arrangement illustrated in FIG. 3B the marker bit is set at bit 5 of the 17-bit register, and hence a range of events is selected, wherein bits 16-6 in the register define the 11 most significant bits of the base event with 5 trailing zeros. All events from bbbb_bbbb_bbb0_0000 to bbbb_bbbb_bbb1_1111 are then selected, i.e. a base event and 31 sequentially following events are selected.

FIG. 3C illustrates a situation in which all events are selected. This is determined by bit 16 of the 17-bit register being set. This means that no bits of the identifier selection register are used and the base event is 0000_0000_0000_0000 followed by $2^{16}-1$ following events, i.e. all $2^{16}$ possible events are selected.

FIGS. 4A, 4B, and 4C show another embodiment in which events may be selected. This embodiment corresponds to an inversion of the embodiment shown in FIGS. 3A, 3B, and 3C. That is, the bit in which the marker bit is stored is defined as the highest bit position at which a logical one is stored. The set of selected events is determined according to the position of this marker bit relative to the most significant bit in the register. As with FIGS. 3A, 3B, and 3C, the use of a 0 or 1 to represent the marker bit is arbitrary and the examples presented in these figures could just as easily be inverted.

In FIG. 4A, the marker bit is stored in bit 16 of the register, as counted from the rightmost (least significant) bit of the register. This bit is the most significant (leftmost) bit that contains a '1'. The notation "b" again denotes that either a one or a zero could be stored in this position and the specific values assigned to these bits determine the set of events that are selected. In the example of FIG. 4A, since the marker bit is stored at bit 16, bits 15 down to 0 of the register determine a single event to be selected. The single event that is selected depends on the values (zero or one) assigned to each of the 16 bits marked "b".

In FIG. 4B, the marker bit is set at bit 11 of the 17-bit register and hence a range of events is selected. Bits 10-0 in the register define the 11 least significant bits of the base event with 5 leading zeros. Similarly, bits 10-0 in the register define the 11 least significant bits of a ceiling identifier, together with 5 leading ones. In particular, 32 events between 0000_0bbb_bbbb_bbbb (the associated base identifier) and 1111_1bbb_bbbb_bbbb (the ceiling identifier) are selected.

In FIG. 4C, all events are selected. This is determined by bit 0 of the 17-bit register being set. This means that no bits of the identifier selection register are used. The base event is 0000_0000_0000_0000. Accordingly, the ceiling identifier is 1111_1111_1111_1111. All $2^{16}$ possible events are, therefore, selected.

FIGS. 5A, 5B, and 5C show another embodiment in which events may be selected. Unlike either the first embodiment shown in FIGS. 3A, 3B, and 3C, or the second embodiment shown in FIGS. 4A, 4B, and 4C, the embodiment shown in FIGS. 5A, 5B and 5C use two marker bits. In particular, a first marker bit is defined as being the lowest bit position in which a logical one is stored and the second marker bit is defined as being the highest bit position in which a logical one is stored. The set of selected events is determined according to the position of both marker bits. In particular, all of the selected events are grouped, with the first marker bit determining the number of events within each group and the position of the second marker bit determining the number of groups. Since this embodiment uses two marker bits, the register contains 18 bits, numbered 0 to 17. The selected events have the same bits in common as those bits that lie between the two marker bits in the register. Again, the use of a 0 or 1 to represent the marker bit is arbitrary.

In FIG. 5A, the first marker bit is stored in bit 0 of the register and the second marker bit is stored in bit 17 of the register. In this example, the position of the first marker bit at bit 0 indicates that $2^0$, i.e. 1, group is to be selected. Similarly, the position of the second marker bit at bit 17 indicates that each group contains $2^{17-17}$, i.e. 1, entry. Bits 16 down to 1 of the register therefore determine which event is to be selected, i.e. the values that are chosen for the bits marked "b" determine the single selected event.

In FIG. 5B, the first marker bit is stored in bit 5 of the register and the second marker bit is stored in bit 16 of the register. A range of events is selected in multiple groups, each group having an associated base identifier. The first marker bit determines the number of events in each group. In this example, the position of the first marker bit at bit 5 indicates that each group contains $2^5$, i.e. 32 events. The second marker bit determines the number of groups. In this example, the position of the second marker bit at bit 16 indicates that there are $2^{17-16}$, i.e. 2 groups. Hence, in this example 64 events are selected, distributed into two groups each containing 32 events.

Each of the groups has an associated base identifier defined by the bits between the two marker bits in the register (marked "b") and a number of trailing zeros defined by the position of the first marker bit. In this example, bits 15-6 in the register define 10 bits that make up the associated base identifier with 5 trailing zeros. The remaining $16^{th}$ bit varies between the different base events. That is, in the example of FIG. 5B, there are two base events at 0bbb_bbbb_bbb0__0000 and 1bbb_bbbb_bbb0__0000. In each of the two groups, 32 events run consecutively from the base events. That is, events from 0bbb_bbbb_bbb0__0000 to 0bbb_bbbb_bbb1__1111 and events from 1bbb_bbbb_bbb0__0000 to 1bbb_bbbb_bbb1__1111 are selected.

In FIG. 5C, all events are selected. This is determined by the first marker bit and second marker bit being in bits 16 and 17 of the 18-bit register. In the example of FIG. 5C, the placement of the marker bits means that no bits of the identifier selection register are used. There is $2^{17-17}$, i.e. 1, group having an associated base identifier of 0000__0000__0000__0000 and being followed by $2^{16}-1$ events, i.e. all $2^{16}$ possible events are selected. It will be appreciated that the same effect is achieved by having the first marker bit and second marker bit being in bits 0 and 1 of the 18-bit register, respectively. In such an embodiment, $2^{17-1}$ groups of identifiers are selected, with each group having a single event. That is, again, all $2^{16}$ possible events are selected.

It will be further appreciated that by providing additional marker bits, with corresponding larger registers, it is possible to select more complicated sets of events.

Figure 6:
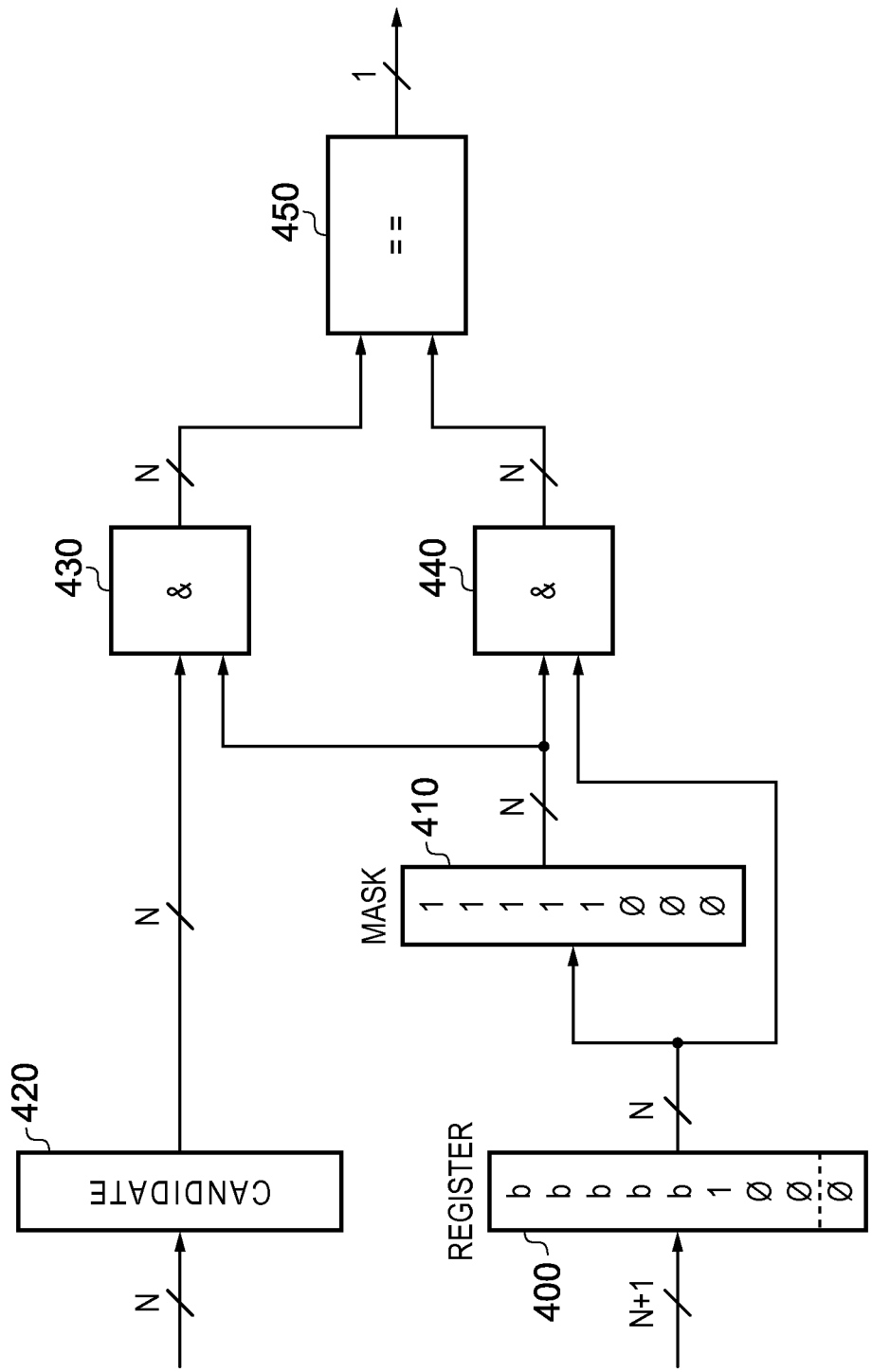
FIG. 6 schematically illustrates circuitry for identifying if a candidate identifier is within a predefined range.

FIG. 6 schematically illustrates example circuitry by means of which, techniques of the present invention may be implemented. A bit pattern stored in register 400 determines the subset of selected identifiers that will be selected. In this example an 8-bit addressing is used, such that $2^8$ identifiers are possible and hence register 400 comprises 9 bits. As illustrated in register 400, bit 3 of the identifier selection bits is set, so that $2^3$ selected identifiers will be selected. An 8-bit mask 410 is created from the contents of register 400, by ignoring bit zero and representing any bit above the marker bit as a one. An N-bit candidate identifier 420 is subjected to a bit-wise AND operation with mask 410 in bit-wise AND unit 430, whilst the N most significant bits in register 400 are also subjected to a bit-wise AND operation with mask 410 in bit-wise AND unit 440. The results of the 2 bit-wise AND operations are then compared in comparator 450, giving a result of one if the candidate identifier falls within the specified range and zero if it does not.

Of course, it will also be appreciated that an inverted selection can also take place to perform a selection in a manner similar to that shown in FIGS. 4A, 4B, and 4C. For example, $2^{9-3}$ selected identifiers can be selected by generating a different 8-bit mask in which bit 8 (i.e. the most significant bit) is ignored and any bit below the marker bit is represented as a one.

Figure 7:
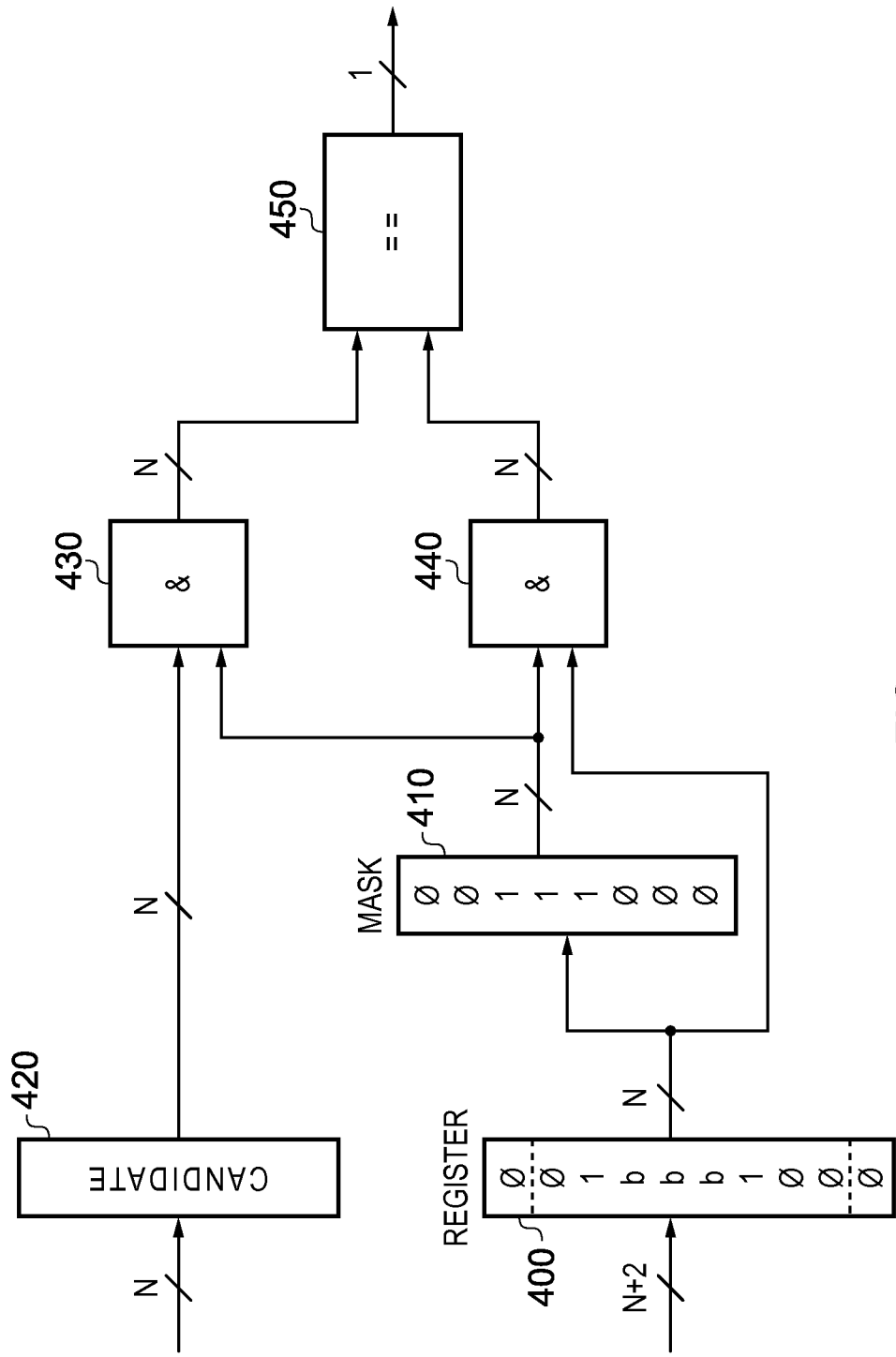
FIG. 7 schematically illustrates alternative circuitry for identifying if a candidate identifier is within a predefined range.

FIG. 7 schematically shows slightly different circuitry in which a selection as demonstrated in FIGS. 5A, 5B, and 5C may take place. The circuitry of FIG. 7 operates in the same way as that of FIG. 6, except as described below. In this circuitry, two marker bits are provided, represented as the most and least significant bits having a value of one. Accordingly, register 400 is a 10-bit (8+2) register. The mask 410 is generated by ignoring both bit 0 and bit 9 (i.e. the least and most significant bits), representing any bit between the marker bits as a one, and representing the remaining bits as zeros.

The skilled person will appreciate that there may be other logically equivalent circuits to those shown in FIG. 6 and FIG. 7. By using De Morgan's Laws, as well as other techniques that will be known to the skilled person, it is possible to produce a number of different circuits that perform the same purpose as that of FIG. 6 or FIG. 7.

Figure 12:
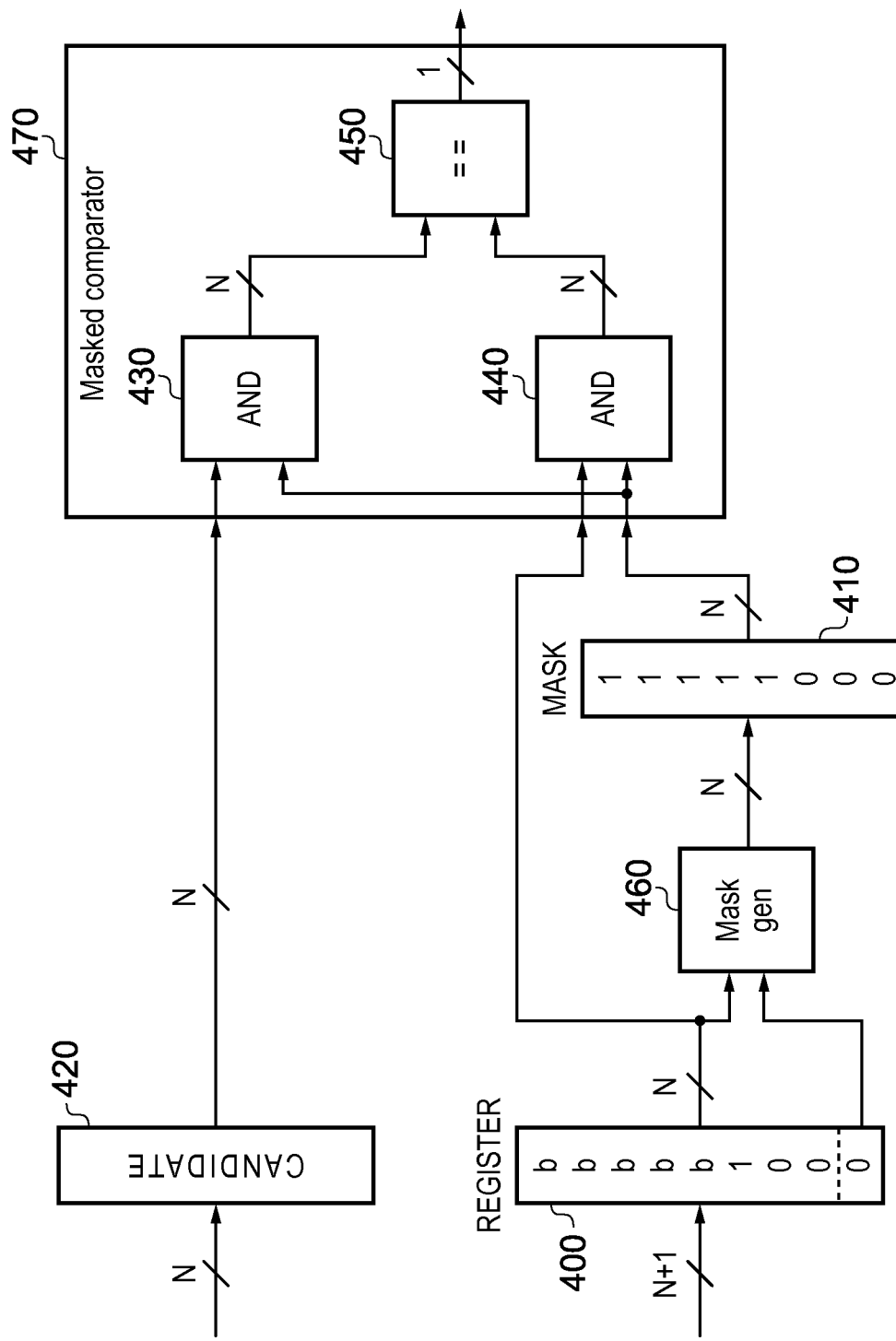
FIG. 12 schematically illustrates generic circuitry for identifying if a candidate identifier is within a predefined range.

FIG. 12 schematically shows a more generic form of the circuitry shown in FIG. 6. A mask generator 460 is used to create a mask from the contents of register 400. A masked comparator 470 compares the N-bit candidate identifier 420 and N bits of the register 400 as qualified by the mask 410 of the mask generator 460. In the example of FIG. 12, a mask 410 is produced by ignoring bit zero and representing any bit above the marker bit as a one. The mask 410 qualifies the comparison by causing the least significant three bits of the candidate identifier 420 and the register 400 to be made equal to zero, thereby preventing a comparison of the least significant three bits of the candidate identifier 420 and register 400 from taking place. The masked comparator 470 causes three logical operations to occur. Firstly, bit-wise AND unit 440 causes a bit-wise AND operation to be performed between the mask 410 and the N-bits from the register 400 to create a first intermediate result. Bit-wise AND unit 430 causes a bit-wise AND operation to be performed between the candidate identifier 420 and the mask 410 to produce a second intermediate result. The first and second intermediate results are then compared by comparator 450.

The skilled person will realise that the same effect can be produced by using logically equivalent circuitry. In particular, the units within the masked comparator 470 may be rearranged or may perform different logical operations, the mask may also be represented in a different way by making equivalent changes in the comparator (for example, by inverting the zeros and ones in the mask), or the mask generator and mask comparator may also be combined into a single unit. Other alternatives will be apparent to the skilled person. In one alternative circuitry, a bit-wise XNOR unit performs a bit-wise XNOR operation between the N-bits from the register 400 and the candidate identifier 420 to produce a first intermediate result. An OR unit performs a bit-wise OR operation between the first intermediate result and the inversion of the mask 410 (i.e. the zeros and ones inverted, as mentioned above) to produce a second intermediate result. A reduction-AND unit then performs a reduction-AND operation on the second intermediate result to indicate whether the candidate identifier 420 is one of the selected identifiers.

Figure 8:
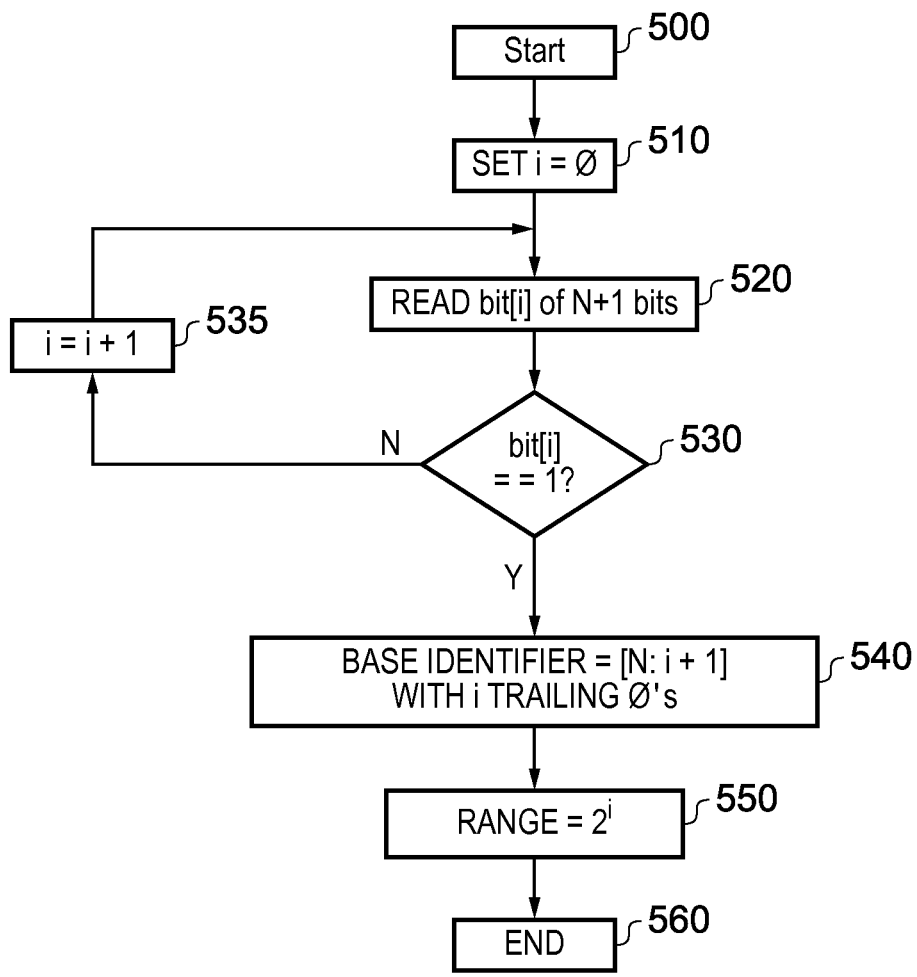
FIG. 8 schematically illustrates a process of determining $2^M$ selected identifiers within a possible range of up to $2^N$ identifiers where M is than or equal to N.

The skilled person will appreciate that the same effect of the circuitry of FIG. 7 can also be produced by logically equivalent circuitry to that of FIG. 7. The circuitry of FIG. 7 differs from that of FIG. 12 in that the register 400 comprises an additional bit (to give N+2 bits in total) and the mask generator 460 generates a different mask 410, as discussed in relation to FIG. 7, due to the use of two marker bits. FIG. 8 schematically illustrates an example process of determining a selection of identifiers from N+1 identifier selection bits. The flow starts at step 500 and proceeds to step 510 where the variable i is set to zero. At step 520 bit i of the N+1 identifier selection bits is read. If at step 530 it is determined that the value at this bit location is not equal to 1 then at step 535 i is incremented by 1 and the flow returns to step 520. If however bit i is found to be equal to 1 at step 530, then at step 540 a base identifier is constructed from bits N to i+1 of the N+1 identifier selection bits with i trailing zeros appended. This defines the associated base identifier and the range is then determined at step 550, given by $2^i$. The flow ends at 560.

Figure 9:
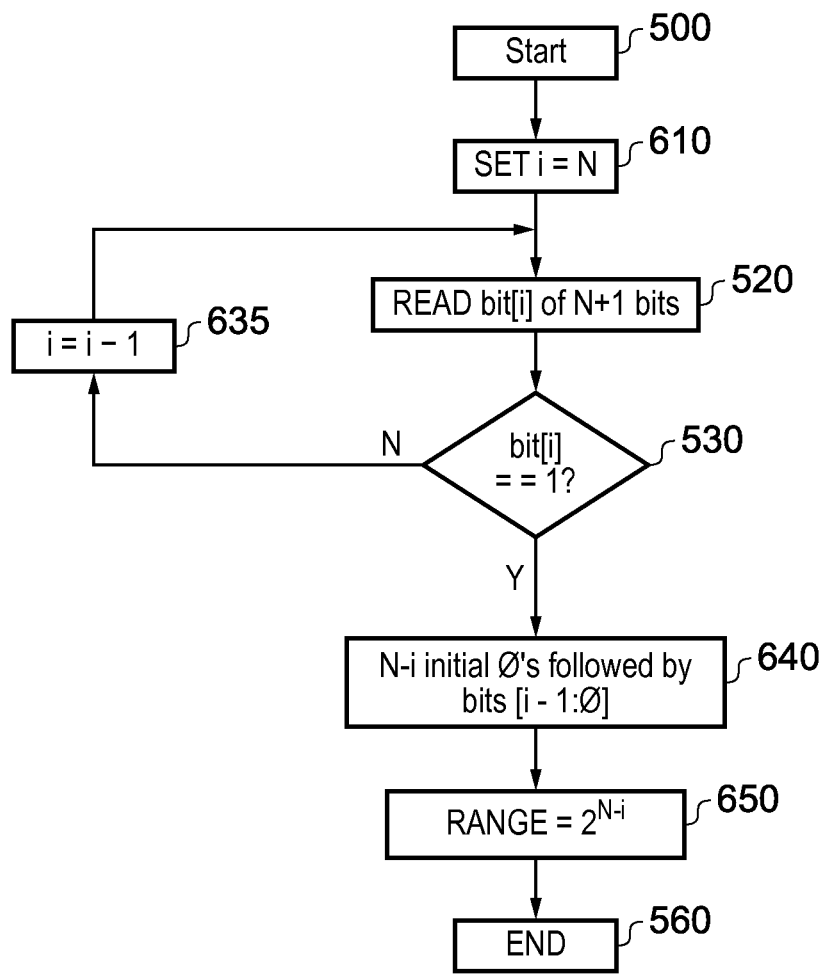
FIG. 9 schematically illustrates an alternative process of determining $2^M$ selected identifiers within a possible range of up to $2^N$ identifiers where M is than or equal to N.

FIG. 9 schematically illustrates an alternative example process of determining a selection of identifiers from N+1 identifier selection bits. Similar steps to those discussed with reference to FIG. 8 have been given the same reference numeral. Similarly to the process shown in FIG. 8, the flow starts at step 500 and proceeds to step 610 where the variable i is set to N. At step 520, bit i of the N+1 identifier selection bits is read. If at step 530 it is determined that the value at this bit location is not equal to 1 then at step 635, i is decremented by 1 and the flow returns to step 520. If however bit i is found to be equal to 1 at step 530, then at step 640 a base identifier is constructed from bits i−1 to 0 of the N+1 identifier selection bits, with N−i leading zeros appended. This defines the associated base identifier and the range is then determined at step 650, given by $2^{N-i}$. In this particular example, the range represents the number of identifiers selected and the identifiers may not follow consecutively from the associated base identifier. The flow ends at 560.

Figure 10:
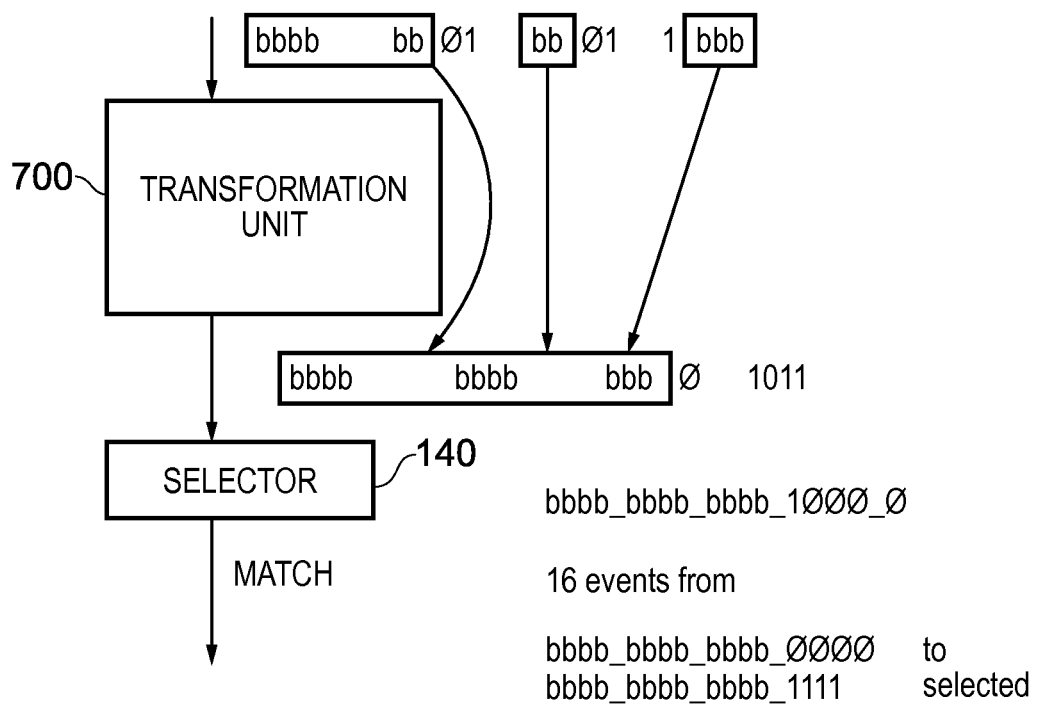
FIG. 10 schematically illustrates circuitry for transforming a candidate identifier prior to being compared as part of the selection process.

FIG. 10 schematically illustrates an embodiment in which a transformation unit 700 is used to transform a candidate identifier prior to being compared to a mask. This embodiment makes it possible, in some cases, to reduce the number of marker bits that are required to perform the selection. For example, in the embodiment shown in FIG. 10, an incoming candidate identifier is input to the transformation unit. The candidate identifier is shown to comprise 11 bits (shown boxed in FIG. 10) that define whether this candidate is one that is being selected or not. The transformation unit transforms the candidate identifier so that these 11 bits of interest are together. The resulting output can then be forwarded to the selector 140 to perform the comparison. As a consequence, it is only necessary to provide a single marker bit in order to determine whether or not this candidate identifier is one that is being selected or not. In particular, by providing identifier selection bits of bbbb_bbbb_bbbb__1000_0, then all 16 events from bbbb_bbbb_bbbb__0000 to bbbb_bbbb_bbbb__1111 are selected, including the modified candidate.

Figure 11:
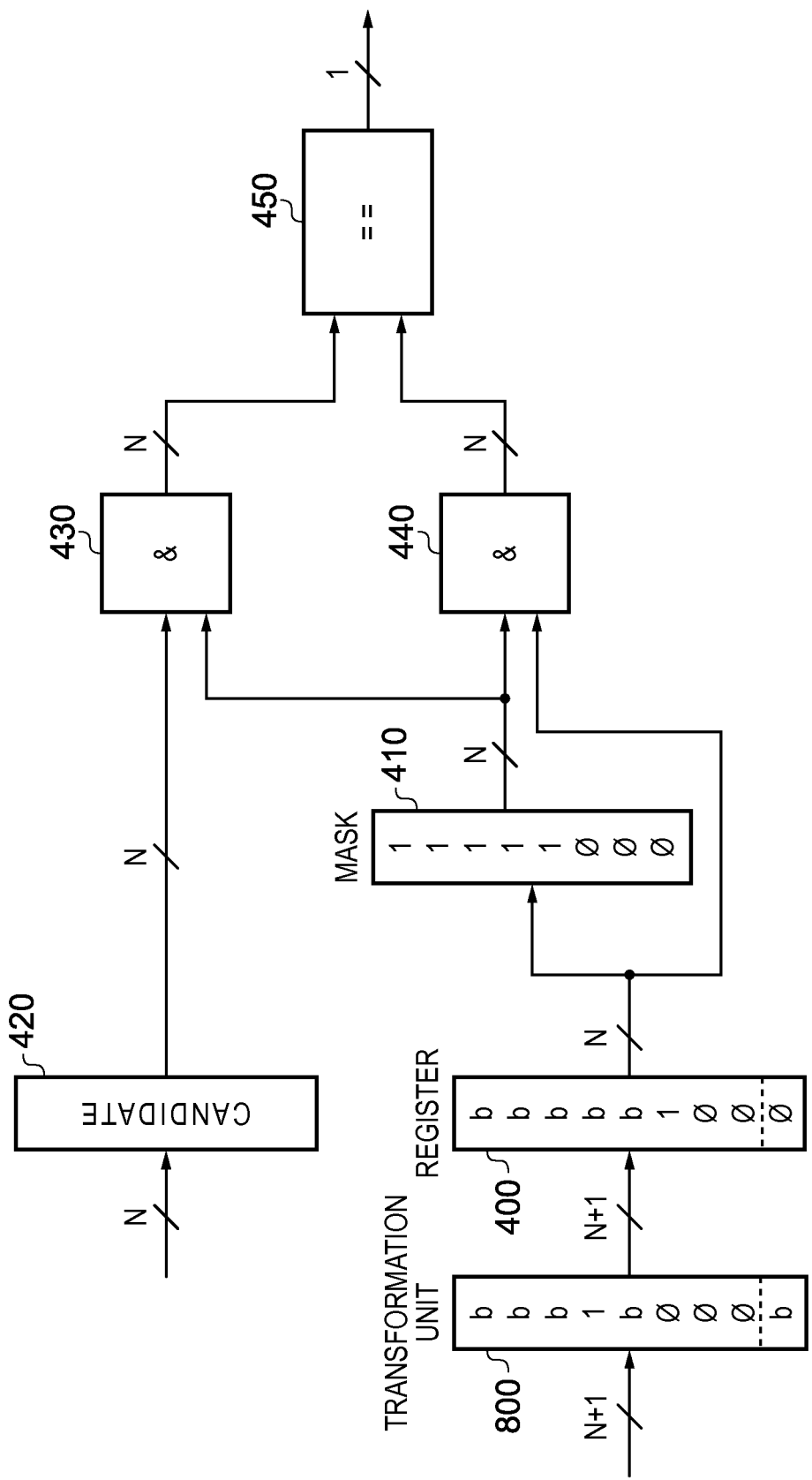
FIG. 11 schematically illustrates circuitry for transforming a set of bits into a set of identifier selection bits.

FIG. 11 shows a similar transformation unit 800 in which a set of N+1 bits are transformed prior to be placed in register 400 and used as identifier selection bits. Again, the set of bits that identify a particular set of events (marked "b") are grouped together by the transformation unit 800.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus configured to select $2^M$ selected identifiers within a possible range of up to $2^N$ identifiers, where M≤N, said data processing apparatus comprising:
   storage circuitry configured to store at least N+1 identifier selection bits, wherein a position of at least a first marker bit in said at least N+1 identifier selection bits determines M; and
   selection circuitry configured to determine said $2^M$ selected identifiers,
   wherein said $2^M$ selected identifiers fall within a range defined by an associated base identifier and a ceiling identifier,
   wherein N-M bits of said at least N+1 identifier selection bits form N-M bits of said associated base identifier, and M zeroes form a further M bits of said associated base identifier,
   wherein said ceiling identifier corresponds to said associated base identifier with said M zeros that form M bits of said associated base identifier replaced with ones.

2. A data processing apparatus as claimed in claim 1,
   wherein said $2^M$ selected identifiers comprise $2^M-1$ selected identifiers following said associated base identifier at increments of $2^{N-M}$,
   wherein N-M bits of said at least N+1 identifier selection bits form N-M least significant bits of said associated base identifier, and M leading zeros form M most significant bits of said associated base identifier.

3. A data processing apparatus as claimed in claim 1,
   wherein said data processing apparatus is configured to select a plurality of groups of selected identifiers, each of said groups of selected identifiers comprising $2^M$ selected identifiers,
   wherein each of said groups of selected identifiers has a different associated base identifier, and
   wherein for each of said groups of selected identifiers, $2^M-1$ selected identifiers incrementally follow said associated base identifier.

4. A data processing apparatus as claimed in claim 3,
   wherein said storage circuitry is configured to store at least N+2 identifier selection bits, wherein a position of at least a second marker bit in said at least N+2 identifier selection bits determines a parameter L,
   wherein said data processing apparatus is configured to select $2^{N-L}$ groups of selected identifiers, where M≤L,
   wherein the plurality of associated base identifiers in said groups of selected identifiers are at increments of $2^{N-L}$.

5. A data processing apparatus as claimed in claim 1, wherein said $2^M$ selected identifiers comprise $2^M-1$ selected identifiers incrementally following said associated base identifier,
   wherein said N-M bits of said at least N+1 identifier selection bits form N-M most significant bits of said associated base identifier, and M trailing zeros form M least significant bits of said associated base identifier.

6. A data processing apparatus as claimed in claim 1, comprising:
a comparison unit configured to determine whether or not a candidate identifier is one of said $2^M$ selected identifiers.

7. A data processing apparatus as claimed in claim 6, comprising:
a transformation unit configured to perform a transformation operation on a candidate identifier to produce a modified candidate identifier,
wherein said comparison unit is configured to determine whether or not said modified candidate identifier is one of said $2^M$ selected identifiers.

8. A data processing apparatus as claimed in claim 1, comprising
a transformation unit configured to perform a transformation operation on at least N+1 input bits to produce said at least N+1 identifier selection bits.

9. A data processing apparatus as claimed in claim 4, comprising
a transformation unit configured to perform a transformation operation on at least N+2 input bits to produce said at least N+2 identifier selection bits.

10. A data processing apparatus as claimed in claim 2, wherein said N-M bits of said at least N+1 identifier selection bits comprise N-M least significant bits of said at least N+1 identifier selection bits.

11. A data processing apparatus as claimed in claim 2, wherein said first marker bit is stored at bit N-M of said at least N+1 identifier selection bits.

12. A data processing apparatus as claimed in claim 4, wherein said second marker bit is stored at bit L+1 of said at least N+2 identifier selection bits.

13. A data processing apparatus as claimed in claim 1, wherein said data processing apparatus comprises a tracing unit configured to provide trace information indicative of activity of a processor core.

14. A data processing apparatus as claimed in claim 13, wherein said up to $2^N$ identifiers comprise channels via which said processor core is configured to pass said trace information to said tracing unit.

15. A data processing apparatus as claimed in claim 1, wherein said up to $2^N$ identifiers are a range of address locations.

16. A data processing apparatus as claimed in claim 15, wherein said data processing apparatus comprises an address monitoring unit configured to monitor use of said range of address locations.

17. A data processing apparatus as claimed in claim 16, wherein said range of address locations is a range of addresses of bytes of memory.

18. A data processing apparatus as claimed in claim 16, wherein said range of address locations is a range of addresses of words of memory.

19. A data processing apparatus as claimed in claim 4, wherein said up to $2^N$ identifiers are a range of address locations,
wherein said data processing apparatus comprises an address monitoring unit configured to monitor use of said range of address locations, and
wherein said address monitoring unit is further configured to monitor a range of words in a range of lines of memory.

20. A data processing apparatus as claimed in claim 15, wherein said address monitoring unit is a watchpoint unit in a processor core.

21. A data processing apparatus as claimed in claim 1, wherein said data processing apparatus comprises a bus transaction monitoring unit configured to monitor use of a range of bus transaction identifiers, and wherein said up to $2^N$ identifiers comprise said range of bus transaction identifiers.

22. A data processing apparatus as claimed in claim 1, wherein said storage circuitry comprises an at least N+1 bit register.

23. A data processing apparatus as claimed in claim 1, wherein said first marker bit comprises a logical 1.

24. A data processing apparatus as claimed in claim 1, wherein said first marker bit comprises a logical 0.

25. A data processing apparatus as claimed in claim 2, wherein said data processing apparatus is configured to identify said first marker bit at a most significant bit position of said at least N+1 identifier selection bits in which a predetermined value is stored.

26. A data processing apparatus as claimed in claim 4, wherein said data processing apparatus is configured to identify said first marker bit at a least significant bit position of said at least N+2 identifier selection bits in which a predetermined value is stored,
wherein said data processing apparatus is configured to identify said second marker bit at a most significant bit position of said at least N+2 identifier selection bits in which a predetermined value is stored.

27. A data processing apparatus as claimed in claim 1, wherein said data processing apparatus comprises a mask generator and a masked comparator unit configured to take, as inputs, outputs of said mask generator, a candidate register, and said storage circuitry.

28. A data processing apparatus as claimed in claim 27, wherein said mask generator is configured to generate a N-bit mask value from said at least N+1 identifier selection bits and said masked comparator unit is configured to compare the outputs of the candidate register and the storage circuitry as qualified by the output of said mask generator.

29. A data processing apparatus as claimed in claim 4,
wherein said data processing apparatus comprises a mask generator and a masked comparator unit configured to take, as inputs, outputs of said mask generator, a candidate register, and said storage circuitry; and
wherein said mask generator is configured to generate a N-bit mask value from said at least N+2 identifier selection bits and said masked comparator unit is configured to compare the outputs of the candidate register and the storage circuitry as qualified by the output of said mask generator.

30. A data processing apparatus configured to select $2^M$ selected identifiers within a possible range of up to $2^N$ identifiers, where M≤N, said data processing apparatus comprising:
selection storage means for storing at least N+1 identifier selection bits, wherein a position of at least a first a marker bit in said at least N+1 identifier selection bits determines M; and
identifier selection means for determining said $2^M$ selected identifiers,
wherein said $2^M$ selected identifiers fall within a range defined by an associated base identifier and a ceiling identifier, wherein N-M bits of said at least N+1 identifier selection bits form N-M t bits of said associated base identifier, and M zeroes form a further M bits of said associated base identifier, wherein said ceiling identifier corresponds to said associated base identifier with said M zeros that form M bits of said associated base identifier replaced with ones.

31. A method of selecting $2^M$ selected identifiers within a possible range of up to $2^N$ identifiers, where M≤N, said method comprising the steps of:

providing, via storage circuit at least N+1 identifier selection bits;

setting at least a first marker bit at a position in said at least N+1 identifier selection bits to determine M; and reading, at selection circuitry, said at least N+1 identifier selection bits, wherein said $2^M$ selected identifiers fall within a range defined by an associated base identifier and a ceiling identifier, wherein N-M bits of said at least N+1 identifier selection bits form N-M bits of said associated base identifier, and M zeroes form a further M bits of said associated base identifier, wherein said ceiling identifier corresponds to said associated base identifier with said M zeros that form M bits of said associated base identifier replaced with ones.

* * * * *